United States Patent
Qiu et al.

(10) Patent No.: US 8,085,017 B2
(45) Date of Patent: *Dec. 27, 2011

(54) PULSE ADDING SCHEME FOR SMOOTH PHASE DROPPING AT LIGHT LOAD CONDITIONS FOR MULTIPHASE VOLTAGE REGULATORS

(75) Inventors: Weihong Qiu, San Jose, CA (US); Robert H. Isham, Flemington, NJ (US); Chun Cheung, Brooklyn, NY (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,102

(22) Filed: Aug. 31, 2010

(65) Prior Publication Data

US 2010/0320977 A1   Dec. 23, 2010

Related U.S. Application Data

(63) Continuation of application No. 11/954,888, filed on Dec. 12, 2007, now Pat. No. 7,812,581.

(60) Provisional application No. 60/916,168, filed on May 4, 2007.

(51) Int. Cl.
*G05F 1/595* (2006.01)
(52) U.S. Cl. .................. 323/272; 323/282; 323/350
(58) Field of Classification Search .......... 323/271, 323/272, 282, 350; 363/71
See application file for complete search history.

(56) References Cited

U.S. PATENT DOCUMENTS

| | | | |
|---|---|---|---|
| 6,281,666 B1 | 8/2001 | Tressler et al. | |
| 6,803,752 B1 | 10/2004 | Chen | |
| 6,826,028 B2 | 11/2004 | Schuellein | |
| 7,071,660 B2 | 7/2006 | Xu et al. | |
| 7,492,134 B2 | 2/2009 | Tang et al. | |
| 7,592,787 B2 | 9/2009 | Qui et al. | |
| 7,812,581 B2* | 10/2010 | Qiu et al. | 323/272 |
| 2002/0135338 A1 | 9/2002 | Hobrecht et al. | |
| 2006/0012351 A1* | 1/2006 | Moussaoui et al. | 323/271 |
| 2006/0238179 A1 | 10/2006 | Harris et al. | |
| 2007/0013356 A1 | 1/2007 | Qiu et al. | |
| 2008/0238390 A1 | 10/2008 | Trivedi et al. | |

* cited by examiner

*Primary Examiner* — Adolf Berhane
*Assistant Examiner* — Fred E Finch, III
(74) *Attorney, Agent, or Firm* — Gary R. Stanford

(57) ABSTRACT

A pulse control system for a multiphase regulator including an error amplifier, a multiphase generator, and an adaptive controller. The error amplifier provides an error signal indicative of output voltage error. The multiphase generator develops modulation pulses for phases based on the error signal. The adaptive controller is responsive to a load indication signal and redirects at least one modulation pulse from a first of phase to a second phase. The load indication signal may be received from a microprocessor indicating a low power mode. The adaptive controller provides a smooth and efficient transition to low load conditions by dropping operation of one or more phases and redirecting modulation pulses to the remaining one or more phases, and reduced phases improve power efficiency for the low load conditions.

20 Claims, 7 Drawing Sheets

PULSE ADDING SCHEME FOR SMOOTH PHASE DROPPING AT LIGHT LOAD CONDITIONS FOR MULTIPHASE VOLTAGE REGULATORS

CROSS-REFERENCE TO RELATED APPLICATIONS

The present application is a continuation of U.S. patent application Ser. No. 11/954,888, filed on Dec. 12, 2007 entitled PULSE ADDING SCHEME FOR SMOOTH PHASE DROPPING AT LIGHT LOAD CONDITIONS FOR MULTIPHASE VOLTAGE REGULATORS, which further claimed the benefit of U.S. Provisional Application Ser. No. 60/916,168, filed on May 4, 2007, both of which being herein incorporated by reference for all intents and purposes.

BACKGROUND OF THE INVENTION

1. Field of the Invention

The invention relates to pulse width modulator-driven multiphase power regulators, and more particularly to control schemes and related architectures for improved efficiency at light load conditions.

2. Description of the Related Art

Multiphase voltage regulators provide a cost-effective power solution when load currents are too high to be readily supported by single-phase regulators. In a multiphase regulator system, the switching on of each channel is generally timed to be symmetrically out of phase with each of the other channels. Conventional multiphase regulators include multiple phase circuits or regulators coupled in parallel each including pulse width modulation (PWM) modulators. While multiphase voltage regulators can achieve relatively high power efficiency at heavy load, the efficiency decreases appreciably at light load conditions due to a higher ratio of switching, gate charge, and inductor core losses over the output power.

Certain microprocessors or central processing units (CPUs) include a mode select signal which is used as an external triggering signal to request a low power mode. The microprocessor asserts the mode select signal to a first state during normal operation when normal current or a relatively high load current is needed. The microprocessor asserts the mode select signal to a second state to indicate a low power mode to reduce load current and thus reduce power consumption. Certain microprocessors support the VR11 power specification by Intel Corporation (e.g., VR11.1) in which the microprocessor asserts a mode select pin PSI# (power state indictor) or the like to indicate normal or light load conditions. The "#" symbol appended to a signal name denotes negative logic in which PSI#=logic 1 (asserted high) for normal operation and PSI#=logic 0 (asserted low) for light load conditions. If the microprocessor or CPU does not provide a mode select pin or signal or the like, other load devices (e.g., system power management controller, regulator controller, etc.) may be configured to perform a similar function. In an alternative arrangement, the load current is simply measured by a current sensor or the like and a mode select signal is asserted when the current drops below a predetermined threshold for a predetermined amount of time.

There are several known schemes for improving power efficiency for multiphase voltage regulators. One scheme is referred to as phase dropping, in which one or more phases are simply "dropped" when a low load condition is requested or sensed as previously described. FIG. 1 is a timing diagram plotting the PSI# signal versus PWM signals PWM1-PWM6 for a six phase voltage regulator illustrating phase dropping for light load conditions. At a time t0, the PSI# signal is initially asserted high indicating normal operation in which pulses are asserted on the PWM1-PWM6 signals out of phase and in sequential order to ensure that each of the phases contribute to the load current. When the PSI# is asserted low at a subsequent time t1, the PWM2-PWM6 signals are turned off or otherwise tri-stated to drop or shut down phases 2-6 while the first phase 1 remains operating during the light load condition. When PSI# is once again asserted high at a subsequent time t2 to indicate a normal or otherwise heavy load condition, the voltage regulator returns to its normal operating mode in which the PWM2-PWM6 signals are reinstated to drive the load current.

It is desired to maintain the output voltage within specifications during phase dropping and reinstatement of dropped phases. The scheme illustrated in FIG. 1, in which several phases are immediately dropped and reinstated, may cause an undesirable glitch or abrupt change of the output voltage while transitioning between normal and low power modes. There are several other known ways to drop phases upon entering a light load condition to better maintain the output voltage within specifications. In another arrangement, a phase is not shut down until after the current through the output inductor of that phase drops to zero or some other predetermined low level. By slowly dropping phases at light load, the regulator controller can slowly increase the current in the remaining phase, resulting in relatively smooth transitioning. In this arrangement, however, multiple switching cycles are used to drop the phases, which results in more PWM cycles of switching, gate charge, and inductor core losses for the phases to be dropped. If the system enters and exits the light load condition at a highly repetitious rate, such as for typical CPU applications, this slow transitioning scheme may result in significantly lower power efficiency.

It is desired to provide a multiphase voltage regulator controller architecture and associated control methodology which provides improved power efficiency at low load currents even under highly repetitious mode switching conditions.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A six (6) phase regulator may source a significant level of load current in a relatively efficient manner when the load current is relatively high. When the load current drops to less than a predetermined threshold, such as about 20 Amperes (A) or less, the power conversion efficiency decreases. Power efficiency may be improved by reducing the number of phases to one or two remaining phases. The present disclosure describes a system and method to maintain the output voltage within specifications and to maintain relatively high efficiency even while switching between normal and low power modes at a relatively high rate. The present disclosure describes a novel arrangement and scheme which is configured to drop one or more phases and to add pulses to the remaining active phase(s) after the mode select signal (e.g., PSI# signal or the like) is asserted or a low power condition is otherwise detected. One or more pulses are added to each remaining phase within one or two PWM switching cycles. The pulse adding arrangement temporarily increases the switching frequency of the remaining phases to allow them to more quickly catch up to the load current in an efficient manner. Since pulse adding allows the remained phase(s) to catch up quickly, the dropped phase(s) can be turned off immediately or within a relatively minimum delay without sacrificing any significant output voltage deviation. The arrangement disclosed and described herein enables significant improvement of the overall average efficiency in those configurations in which a microprocessor toggles a PSI# signal or the like at a relatively high repetitious rate, such as on the order of several kilohertz (KHz).

Figure 1:
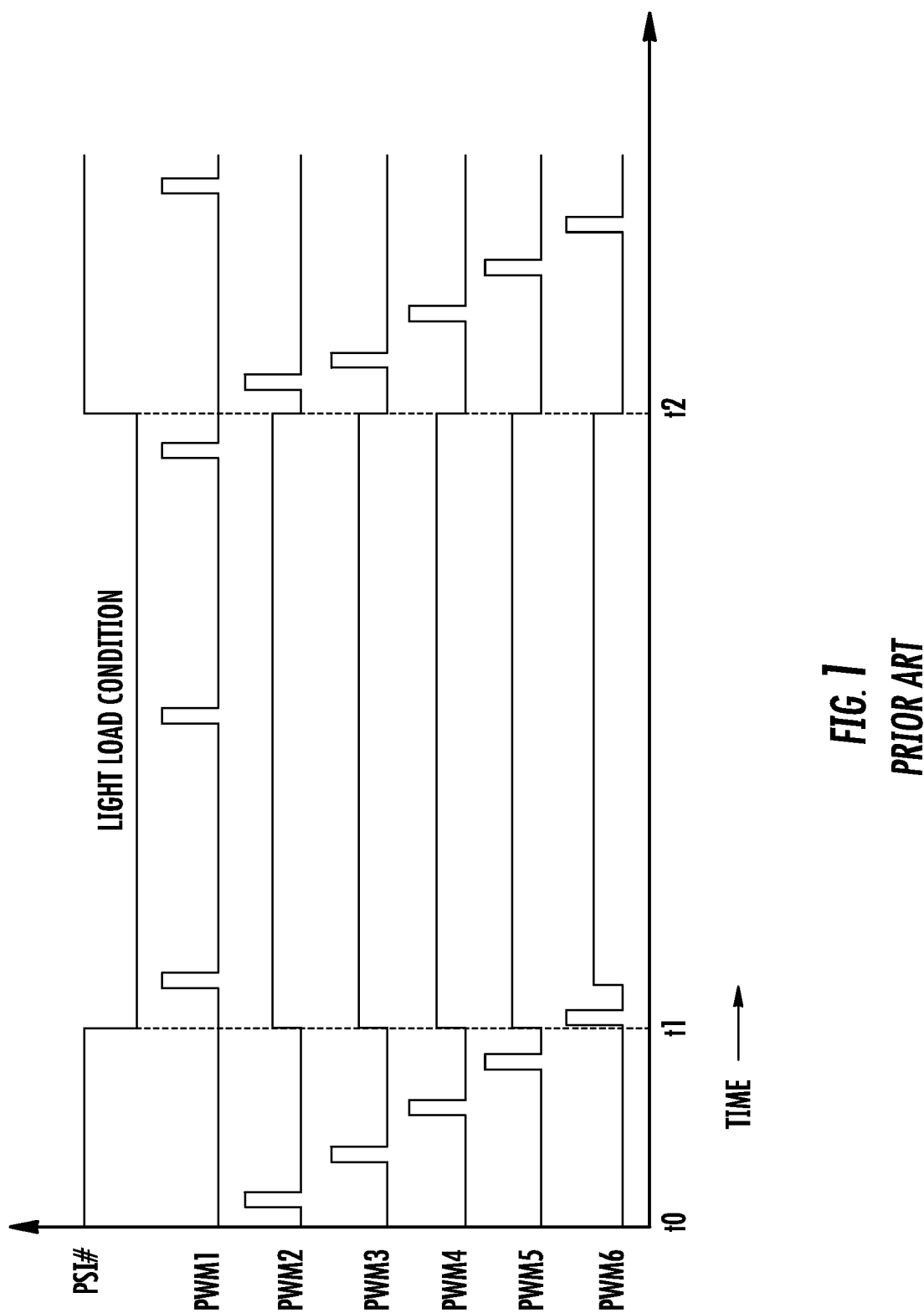
FIG. 1 is a timing diagram plotting the PSI# signal versus PWM signals PWM1-PWM6 for a six phase voltage regulator illustrating phase dropping for light load conditions.
Figure 2:
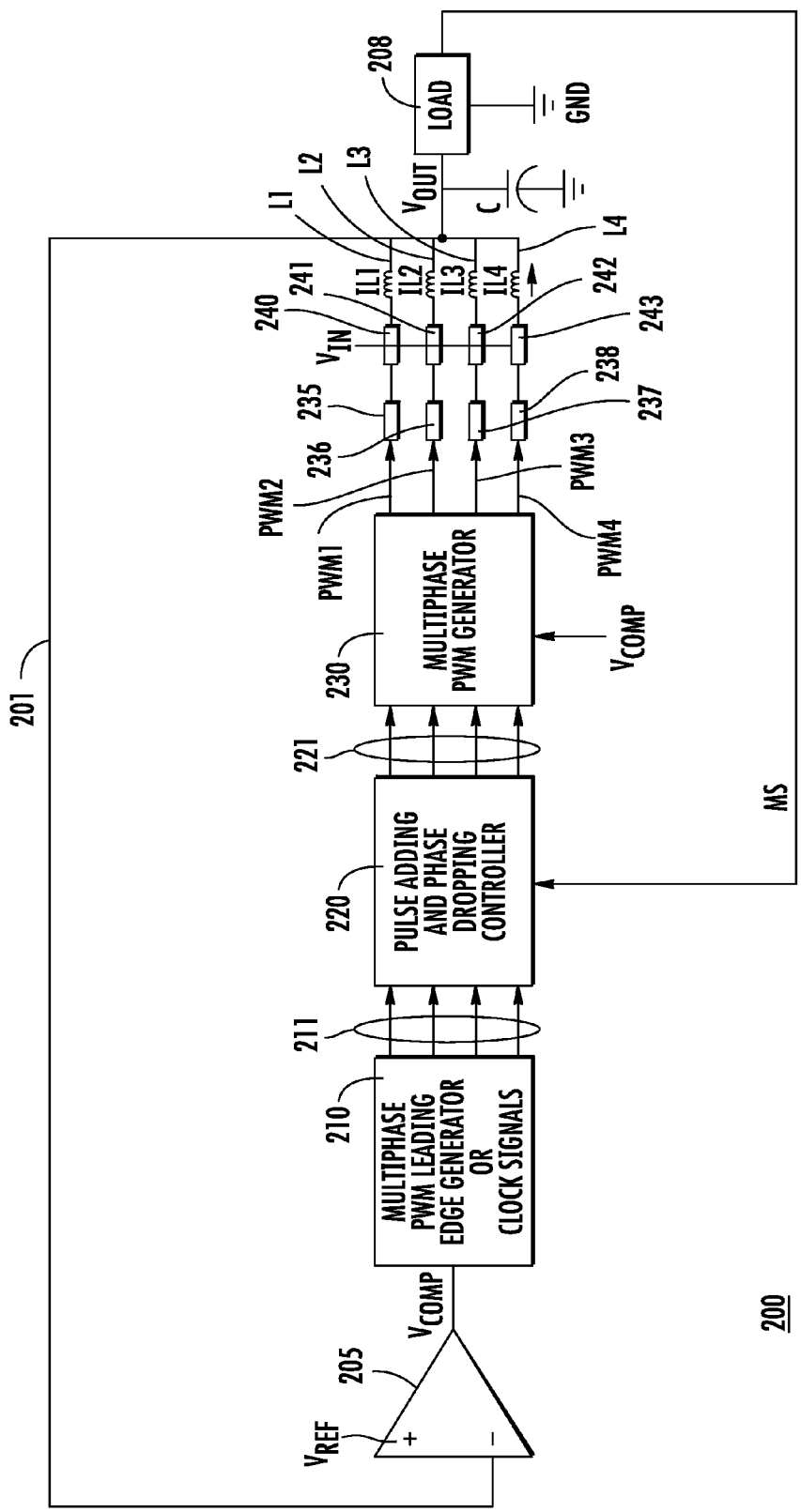
FIG. 2 is a block diagram of a multiphase (4 phase) PWM regulator implemented according to an exemplary embodiment.

FIG. 2 is a block diagram of a multiphase (4 phase) PWM regulator 200 implemented according to an exemplary embodiment. The multiphase regulator 200 includes an output node 201 developing an output voltage $V_{OUT}$. The multiphase regulator 200 includes an error amplifier 205 having an output developing a compensation voltage $V_{COMP}$ provided to an input of a multiphase PWM leading edge generator or clock signals block 210. The multiphase PWM leading edge generator or clock signals block 210 includes any suitable circuitry for triggering PWM pulses. In the illustrated embodiment, the leading edge generator 210 compares leading edge signals with the $V_{COMP}$ voltage and generates corresponding leading edge pulses on corresponding outputs 211. The outputs 211 include four separate signals although it is understood that more or less phases may be included. The outputs 211 are provided to respective inputs of an adaptive control block, shown as a pulse adding and phase dropping controller 220. The pulse adding and phase dropping controller 220 provides corresponding outputs 221 (e.g., four outputs 221) to respective inputs of a multiphase PWM generator 230, which outputs corresponding PWM output signals PWM1, PWM2, PWM3, and PWM4. The PWM1-PWM4 signals are provided to inputs of switch drivers 235, 236, 237, and 238, respectively, having outputs coupled to respective inputs of switch circuits 240, 241, 242 and 243, respectively. The switch circuits 240-243 each receive an input voltage $V_{IN}$ and are each coupled to one end of a corresponding one of output inductors L1, L2, L3 and L4, having their other ends coupled together at the output node 201. A load capacitor C and a load 208 are shown coupled between the output node 201 and ground. The output node 201 developing the output voltage $V_{OUT}$ is fed back to the inverting input of the error amplifier 205, which receives a reference voltage $V_{REF}$ at its non-inverting input. In an alternative embodiment, $V_{OUT}$ is sensed by a sensing circuit (not shown) which provides a proportional voltage of $V_{OUT}$ of the error amplifier 205 in which $V_{REF}$ is adjusted accordingly. In any event, the $V_{COMP}$ voltage indicates the relative error of the $V_{OUT}$ signal relative to the desired level represented by $V_{REF}$. The $V_{COMP}$ voltage is provided to another input of the multiphase PWM generator 230. The load 208 provides a mode control signal MS to an input of the pulse adding and phase dropping controller 220.

In one embodiment, each of the switch circuits 240-243 operates in a buck converter configuration for converting the input voltage $V_{IN}$ to the output voltage $V_{OUT}$. In a more specific embodiment, a first or upper electronic switch (not shown) is coupled between $V_{IN}$ and a phase node (not shown) which is further coupled to a corresponding one of the output inductors L1-L4. A second or lower electronic switch (not shown) is coupled between the phase node and ground. When the corresponding one of the PWM1-PWM4 signal is asserted high, the corresponding one of the switch circuits 240-243 activates or turns on the upper electronic switch (while turning off the lower electronic switch) to couple the input voltage VIN to the corresponding output inductor. When the corresponding PWM signal goes low, the upper switch is turned off and the lower switch is turned on. In one embodiment, the electronic switches are implemented as N-channel or P-channel devices, such as metal-oxide semiconductor field-effect transistors (MOSFETs) or the like, in which each of the switch drivers includes upper and lower gate drivers controlled by a corresponding PWM signal as understood by those skilled in the art. In a low power mode, both electronic switches may be turned off to effectively tri-state the corresponding phase node so that the corresponding phase is effectively dropped. A diode emulation mode (DEM) is also contemplated in which the lower electronic switch is turned off when the current through the corresponding output inductor reaches zero. The currents through the inductors L1-L4 are shown as IL1, IL2, IL3 and IL4, respectively.

In operation, the multiphase PWM leading edge generator or clock signals block 210 generates modulation or clock pulses on each phase of the corresponding outputs 211. If the MS signal is not asserted (or otherwise asserted low or negated) indicating normal mode of operation, then the pulses generated by the multiphase PWM leading edge generator or clock signals block 210 are passed through the pulse adding and phase dropping controller 220 to the multiphase PWM generator 230 via the corresponding outputs 221. In response to each pulse for each phase, the multiphase PWM generator 230 initiates or asserts a corresponding modulation pulse on a corresponding one of the PWM1-PWM4 signals. This effectively initiates a power portion of the cycle for that phase (e.g., turns on upper switch). Each phase circuit within the multiphase PWM generator 230 further monitors the $V_{COMP}$ voltage for determining when to terminate the pulse on the corresponding PWM signal to terminate the power portion of that phase (e.g., turn off upper switch). Thus, the multiphase PWM leading edge generator or clock signals block 210 determines PWM pulse assertion timing the multiphase PWM generator 230 determines the duration of each PWM pulse. In this manner, the multiphase PWM leading edge generator or clock signals block 210 and the multiphase PWM generator 230 collectively form a modulation circuit which generates pulses on the PWM signals based on the $V_{COMP}$ voltage.

When the MS signal is asserted indicating a low power mode or light load condition, the pulse adding and phase dropping controller 220 drops one or more phases by suppressing the pulses received from the multiphase PWM leading edge generator or clock signals block 210 for the dropped phases. Since the triggering pulses are suppressed for the dropped phases, the PWM signal for the dropped phases remains unasserted so that each dropped phase no longer contributes to the output load current. Furthermore, the pulse adding and phase dropping controller 220 adds one or more pulses to each of the remaining phases. Thus, each remaining phase receives the initiating pulses that it would normally receive in addition to at least one added pulse. It is noted that under very low load current conditions, pulses may not be added to the remaining pulses. In one embodiment, adding a pulse to a remaining phase may be achieved by redirecting a pulse from a dropped phase to a remaining phase.

Figure 3:
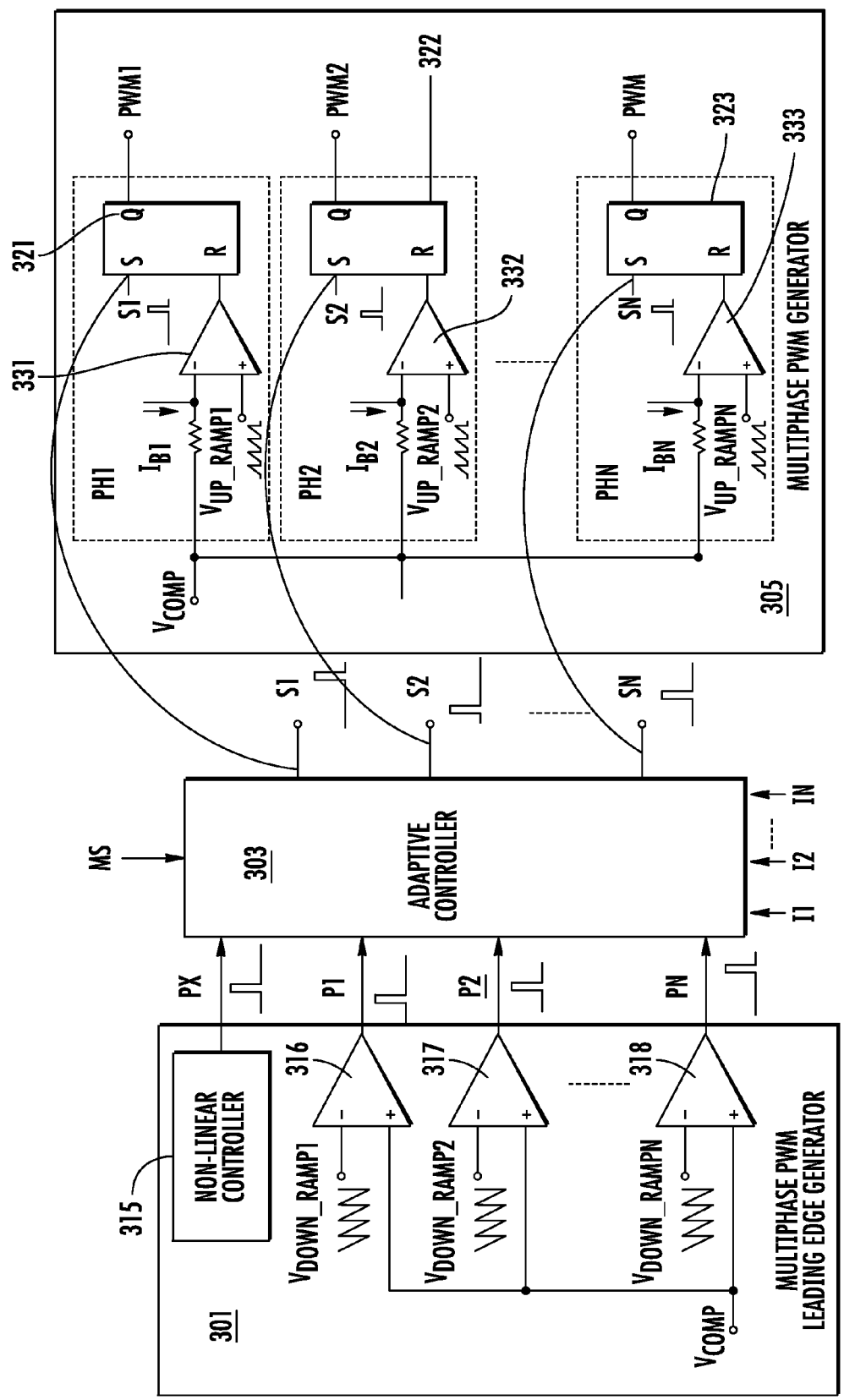
FIG. 3 is a more detailed schematic and block diagram of an adaptive modulator having an adaptive circuit arrangement implemented according to an exemplary embodiment.

FIG. 3 is a more detailed schematic and block diagram of an adaptive modulator 300 having an adaptive circuit arrangement implemented according to an exemplary embodiment. The adaptive modulator 300 illustrates any integer number "N" of phases and includes a multiphase PWM leading edge generator 301, an adaptive controller 303, and a multiphase PWM generator 305. The adaptive modulator 300 may replace the multiphase PWM leading edge generator or clock signals block 210, the pulse adding and phase dropping controller 220 and the multiphase PWM generator 230 of the multiphase regulator 200 (adjusted according to the number of phases desired). The multiphase PWM leading edge generator 301 provides pulses on pulse signals P1, P2, ..., PN to respective inputs of the adaptive controller 303, which provides corresponding pulses on pulse signals S1, S2, ..., SN to respective inputs of the multiphase PWM generator 305. The adaptive controller 303 receives the MS signal. The multiphase PWM generator 305 initiates corresponding pulses on output PWM signal PWM1, PWM2, ..., PWMN signals, which are then provided to corresponding switch drivers (not shown). The switch drivers may be configured in a similar manner as the switch drivers 235-238 previously described for controlling corresponding switch circuits as previously described. The adaptive controller 303 receives the MS signal and performs phase dropping and pulse adding in a similar manner as described herein. In the illustrated embodiment, the adaptive controller 303 receives additional phase currents I1, I2, ..., IN.

In the particular embodiment illustrated, the multiphase PWM leading edge generator 301 includes N down ramp comparators 316, 317, ..., 318, each having a non-inverting input receiving the $V_{COMP}$ voltage. The inverting inputs of the down ramp comparators receive corresponding down ramp signals $V_{DOWN\_RAMP1}$, $V_{DOWN\_RAMP2}$, ..., $V_{DOWN\_RAMPN}$, respectively. Each down ramp signal starts from a higher voltage level and ramps down at a constant rate until it reaches a lower voltage level and then resets high again. The down ramp signals are generally timed to be symmetrically out of phase with each other. Each of the comparators 316-318 generates a leading edge or "turn-on" pulse on a corresponding one of the P1-PN signals when a respective ramp signal falls to the voltage level of the $V_{COMP}$ voltage. Assuming normal operation and while the MS signal is not asserted, the turn-on pulses asserted on the P1-PN signals are forwarded as corresponding turn-on pulses on the S1-SN signals, respectively. The multiphase PWM generator 305 includes N phase circuits PH1, PH2, ..., PHN. Each phase circuit PH1-PHN includes a set-reset (SR) flip-flop having a set (S) input receiving a corresponding on of the S1-SN signals. As shown, S1 is provided to the S input of an SR flip-flop 321 in phase circuit PH1, S2 is provided to the S input of an SR flip-flop 322 in phase circuit PH2, and so on up to the last phase circuit PHN having an SR flip-flop 323 with S input receiving SN. The Q outputs of the SR flip-flops 321-323 provide the corresponding PWM1-PWMN signals. The $V_{COMP}$ voltage is provided through corresponding resistive devices to the inverting inputs of respective up ramp comparators 331, 332, ..., 333 within the phase circuits PH1-PHN, respectively. Current balance currents $I_{B1}$, $I_{B2}$, ..., $I_{BN}$ are injected into the inverting inputs of the comparators 331-333, respectively, for current balance between the phases. Up ramp voltages $V_{UP\_RAMP1}$, $V_{UP\_RAMP2}$, ..., $V_{UP\_RAMPN}$ are provided to respective non-inverting inputs of the comparators 331-333, respectively. The outputs of the comparators 331-333 are provided to respective reset (R) inputs of the SR flip-flops 321-323, respectively, as illustrated.

Each of the up ramp signals $V_{UP\_RAMP1}$-$V_{UP\_RAMPN}$ ramps up at a relatively constant rate from a lower voltage level in response to a turn-on pulse received on a corresponding one of the S1-SN signals from the adaptive controller 303. When the corresponding one of the comparators 331-333 senses the up ramp voltage rising to the voltage of the $V_{COMP}$ signal (as adjusted by a corresponding $I_{BN}$ current), a corresponding one of the comparators 331-333 asserts its output high resetting a corresponding one of the SR flip-flops 321-323 of the corresponding phase circuit. Each up ramp signal is reset low when the corresponding up ramp comparator or the corresponding PWM signal switches state. In this manner, in response to a turn-on pulse on a corresponding one of the S1-SN signals, a PWM pulse is initiated on a corresponding one of the PWM1-PWMN signals, and an up ramp is initiated on the corresponding one of the $V_{UP\_RAMP1}$-$V_{UP\_RAMPN}$ ramp voltages. When the up ramp signal rises to the $V_{COMP}$ voltage level, the up ramp comparator switches state terminating the PWM pulse which resets the up ramp signal back low. Operation repeats in this manner for each of the phase circuits PH1-PHN.

In the embodiment, illustrated, the multiphase PWM leading edge generator 301 also includes a non-linear controller 315. A change of the $V_{COMP}$ voltage can be sensed under a transient event. If the $V_{COMP}$ voltage changes quickly in a relatively short time, the non-linear controller 315 turns on all phases at the same time via signal PX provided to another input of the adaptive controller 303.

When the MS signal is asserted, the adaptive controller 303 drops one or more of the phases by suppressing the selected signals P1-PN of the dropped phased from being forwarded to the corresponding S1-SN signals of the dropped phases. Thus, the turn-on pulses on the S1-SN signals of the dropped phases are not provided to the phase circuits PH1-PHN of the dropped phases. Also, the adaptive controller 303 adds at least one pulse on each of the remaining phases. The pulse adding may be performed by redirecting at least one turn-on pulse from a dropped phase to a pulse on the corresponding S1-SN signal of the remaining phase.

Figure 4:
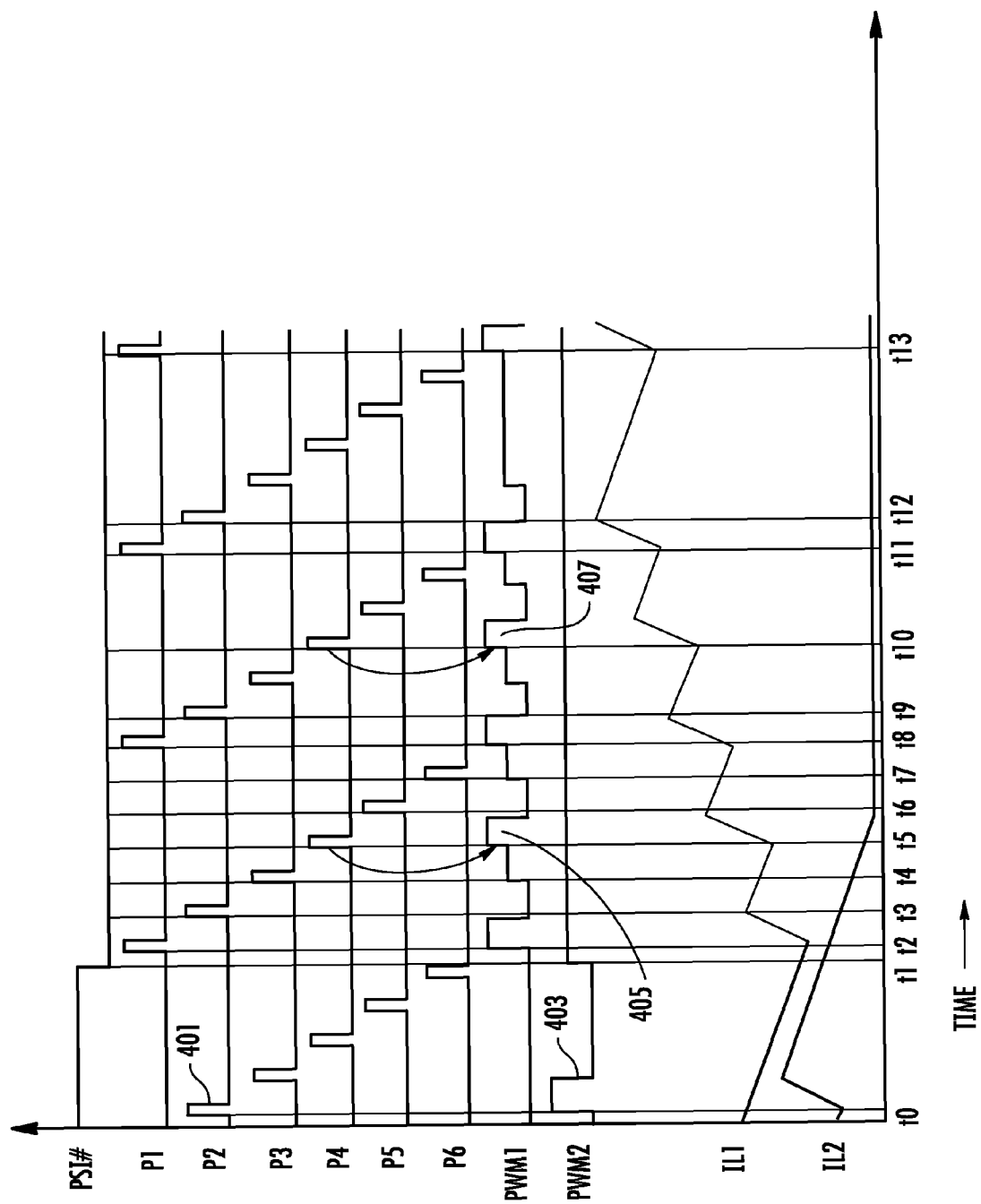
FIG. 4 is a timing diagram illustrating a phase dropping and pulse adding scheme according to one embodiment for a six phase voltage regulator which drops to single phase operation at light load.

FIG. 4 is a timing diagram illustrating a phase dropping and pulse adding scheme according to one embodiment for a six phase voltage regulator which drops to single phase operation at light load. The PSI# signal, turn-on pulse signals P1-P6, PWM signals PWM1 and PWM2, and inductor currents IL1 and IL2 of phases 1 and 2, respectively, are plotted versus time. At an initial time t0, the PSI# signal is asserted high indicating normal operating mode. Pulses are asserted synchronously out of phase on the P1-P6 signals causing corresponding pulses on the corresponding PWM signals. As shown, for example, a pulse 401 on the P2 signal results in a pulse 403 asserted on the PWM2 signal. It is noted that when the pulse 403 on PWM2 is asserted, the current IL2 ramps up, and when the pulse 403 is terminated, the current IL2 reverses and ramps back down. Although the PWM3-PWM6 signals are not shown, the turn-on pulses on the P3-P6 signals initiate corresponding pulses on the PWM3-PWM6 signals in a similar manner during normal operation to drive currents through corresponding output inductors. At a subsequent time t1, the PSI# signal is asserted low indicating a low or light load condition. The phases 2-6 are dropped and only phase 1 remains operative. As shown, for example, the PWM2 signal is shown tri-stated. The turn-on pulses on the P1 signal at times t2, t8, t11, t13, etc., continue to initiate corresponding pulses at about the same times on the PWM1 signal. Two extra PWM pulses 405 and 407 at times t5 and t10, respectively, are added to PWM1 of phase 1 to push the inductor current IL1 close to the load current in one or two cycles. As shown, the inductor current IL2 of dropped phase 2 eventually goes to zero while the inductor current IL1 of the first phase 1 is increased since it handles the full load in the low power state.

In the illustrated embodiment, to simplify the control and reduce the output voltage ripple, each extra PWM pulse on the PWM1 signal is triggered by the turn-on pulse associated with a dropped phase. As shown, the next two turn-on pulses (or clock signals) of phase 4 at times t5 and t10 are redirected to the first phase 1 to activate the additional pulses 405 and 407 on PWM1. The presence of the intermediate level on PWM1 prior to the turn on pulses is due to a particular method of communication between the controller and the driver, and is not required nor germane to the present invention. Briefly, the intermediate level shown is related discontinuous conduction which stops the driver from driving the inductor when the inductor current becomes negative.

Based on the load current and current slew rate of the inductor current, one or more extra PWM pulses may not be needed, and if so, can be prevented from occurring. For example, no extra PWM pulse is needed if the load current is very low, while only one extra PWM pulse is used for some low load conditions somewhat higher than the very low load condition. In one embodiment, the extra PWM pulses are sufficiently spaced from normal PWM1 pulses to obtain smooth output voltage ripple (i.e., reserve some ON time for the lower electronic switch associated with phase 1). Based on the total phase number, the extra PWM pulse position can be selected that are furthest out of phase relative to the pulses on the remaining phase(s). In the illustrated embodiment, the turn-on pulse(s) of phase 4 are redirected to trigger PWM pulses on the PWM1 signal as shown since PWM4 is normally 180 degrees out phase with respect to PWM1 in the six phase case. The extra pulses are maximally spaced 180 degrees out of phase as compared to the normal pulses on the PWM1 signal.

The adaptive modulator 300 may be configured to operate according to the timing diagram illustrated in FIG. 4. The MS signal is configured as the PSI# signal and six phases are implemented with corresponding signals P1-P6, S1-S6 and PWM1-PWM6. When the PSI# signal is high for normal operation, the adaptive controller 303 passes the pulses on the P1-P6 signals to the S1-S6 signals, respectively. When the PSI# signal is asserted low for low load conditions, the pulses on the P1 signal are passed to the S1 signal as normal but the signals S2-S6 remain low regardless of pulses asserted on the P2-P6 signals. The first one or two pulses on the P4 signal after assertion of PSI# low are redirected by the adaptive controller 303 to the S1 signal to generate additional pulses on the PWM1 signal as previously described.

Figure 5:
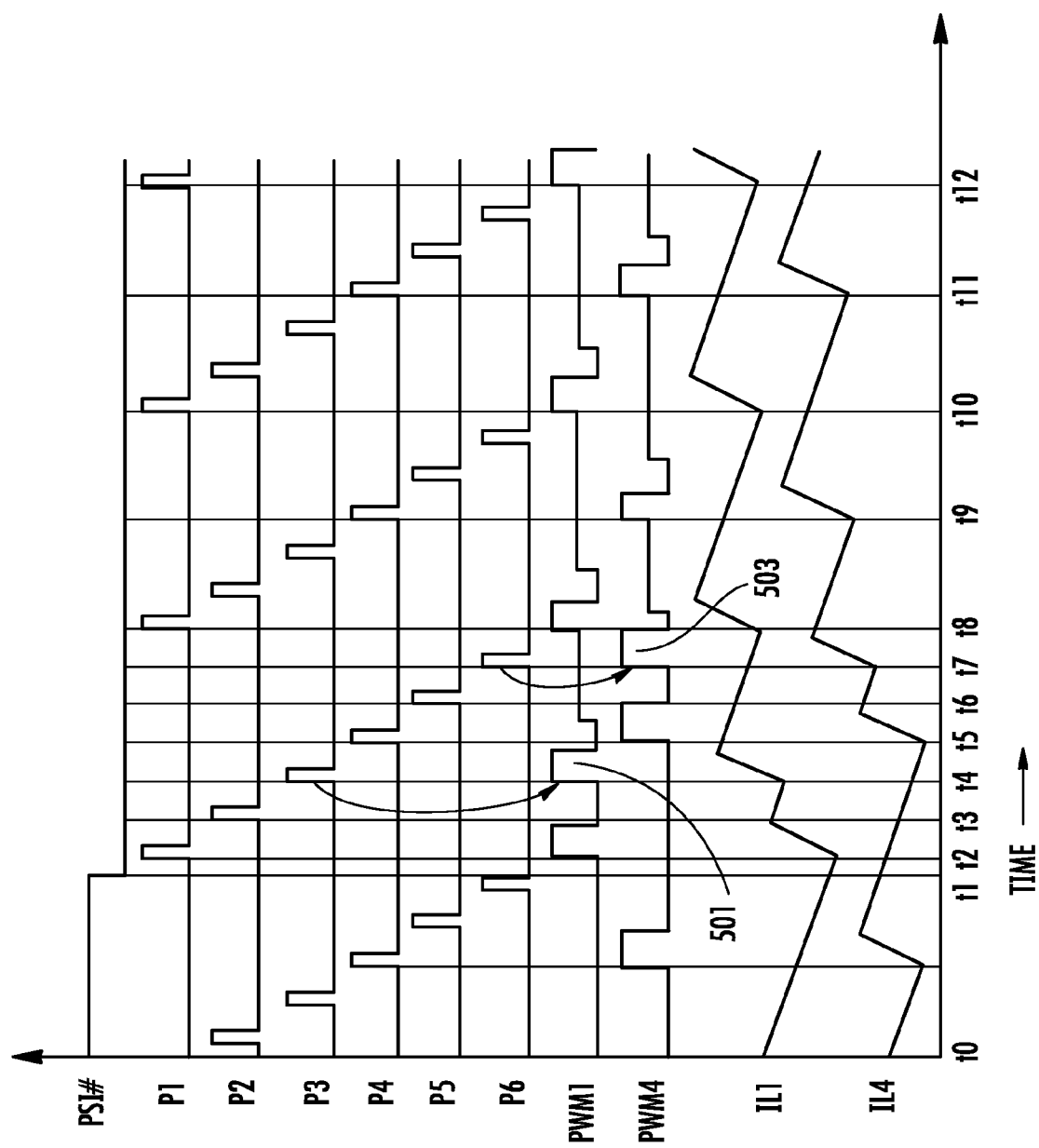
FIG. 5 is a timing diagram illustrating a phase dropping and pulse adding scheme according to another embodiment for a six phase voltage regulator which drops to two-phase operation at light load.

FIG. 5 is a timing diagram illustrating a phase dropping and pulse adding scheme according to another embodiment for a six phase voltage regulator which drops to two-phase operation at light load. The PSI# signal, turn-on pulse signals P1-P6, PWM signals PWM1 and PWM4, and inductor currents IL1 and IL4 of phases 1 and 4, respectively, are plotted versus time. Again, at an initial time t0, the PSI# signal is initially asserted high indicating normal operating mode. Turn-on pulses are asserted synchronously out of phase on the P1-P6 signals causing corresponding pulses on the corresponding PWM signals. At a time t1, the PSI# signal is asserted low indicating a low load condition. The phases 2, 3, 5 and 6 are dropped so that only phases 1 and 4 remain operative. The turn-on pulses on the P1 signal continue to generate corresponding PWM pulses on the PWM1 signal at times t2, t8, t10, t12, etc., and the pulses on the signal P4 continue to generate corresponding PWM pulses on the PWM4 signal at times t5, t9, t11, etc. In this case, one extra PWM pulse is added to each of the remaining phases 1 and 4. As shown, PWM1 includes an additional pulse 501 and PWM2 includes an additional pulse 503. In the illustrated embodiment, to maintain the smooth transitioning, the next turn-on pulse for dropped phase 3 at time t4 is redirected to remaining phase 1 to generate the extra PWM pulse 501 for phase 1 at time t4, and the next turn-on pulse of dropped phase 6 at time t7 is redirected to remaining phase 4 to generate the extra PWM pulse 503 for phase 4 at time t7.

The adaptive modulator 300 may be configured to operate according to the timing diagram illustrated in FIG. 5. The MS signal is configured as the PSI# signal and six phases are implemented with corresponding signals P1-P6, S1-S6 and PWM1-PWM6. When the PSI# signal is high for normal operation, the adaptive controller 303 passes the pulses on the P1-P6 signals to the S1-S6 signals, respectively. When the PSI# signal is asserted low for low load conditions, the pulses on the P1 and P4 signals are passed to the S1 and S4 signals, respectively, as normal. The signals S2, S3, S5 and S6 remain low regardless of pulses asserted on the S2, S3, S5 and S6 signals. At least one pulse on the P3 signal after assertion of PSI# low is redirected by the adaptive controller 303 to the S1 signal to generate at least one additional pulse on the PWM1 signal as previously described. At least one pulse on the P6 signal after assertion of PSI# low is redirected by the adaptive controller 303 to the S4 signal to generate at least one additional pulse on the PWM4 signal as previously described.

Figure 6:
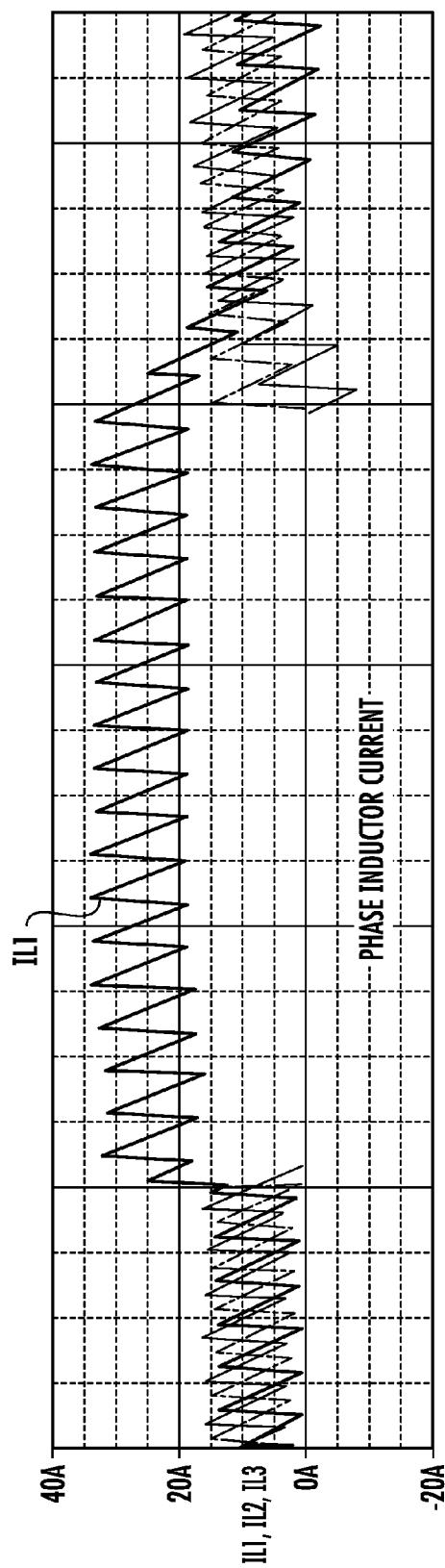
FIGS. 6 and 7 are timing diagrams plotting simulation data for phase-adding and phase-dropping, respectively for a three phase regulator which drops to single phase operation at low load.
Figure 6:
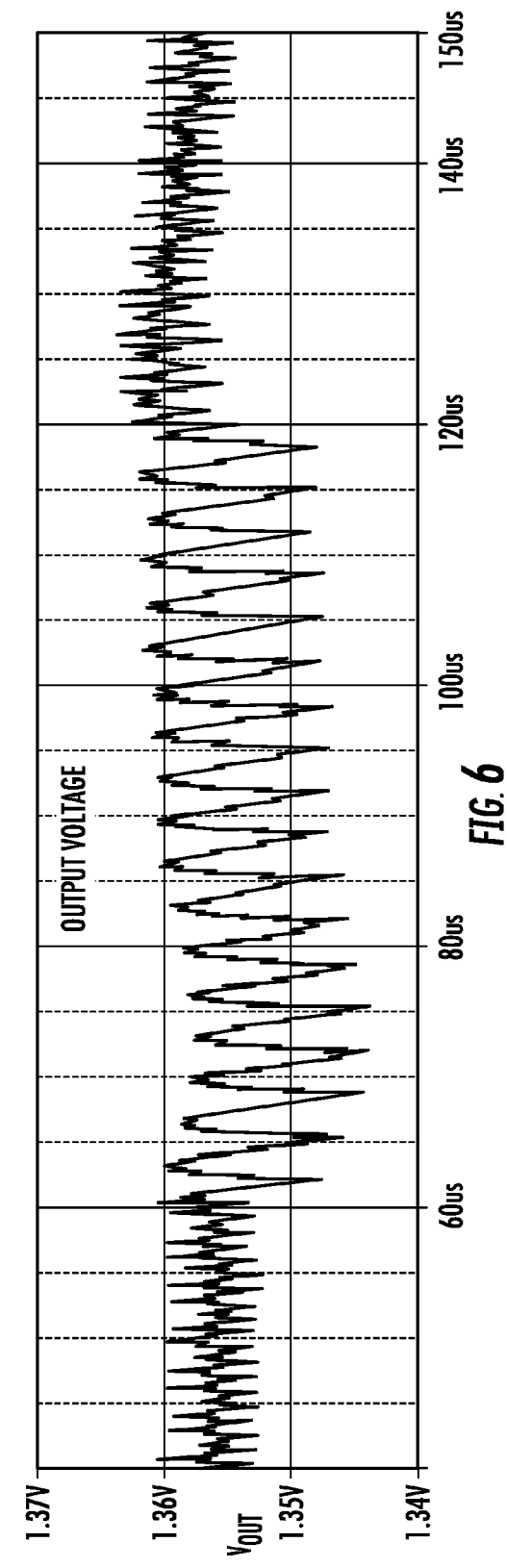
Figure 7:
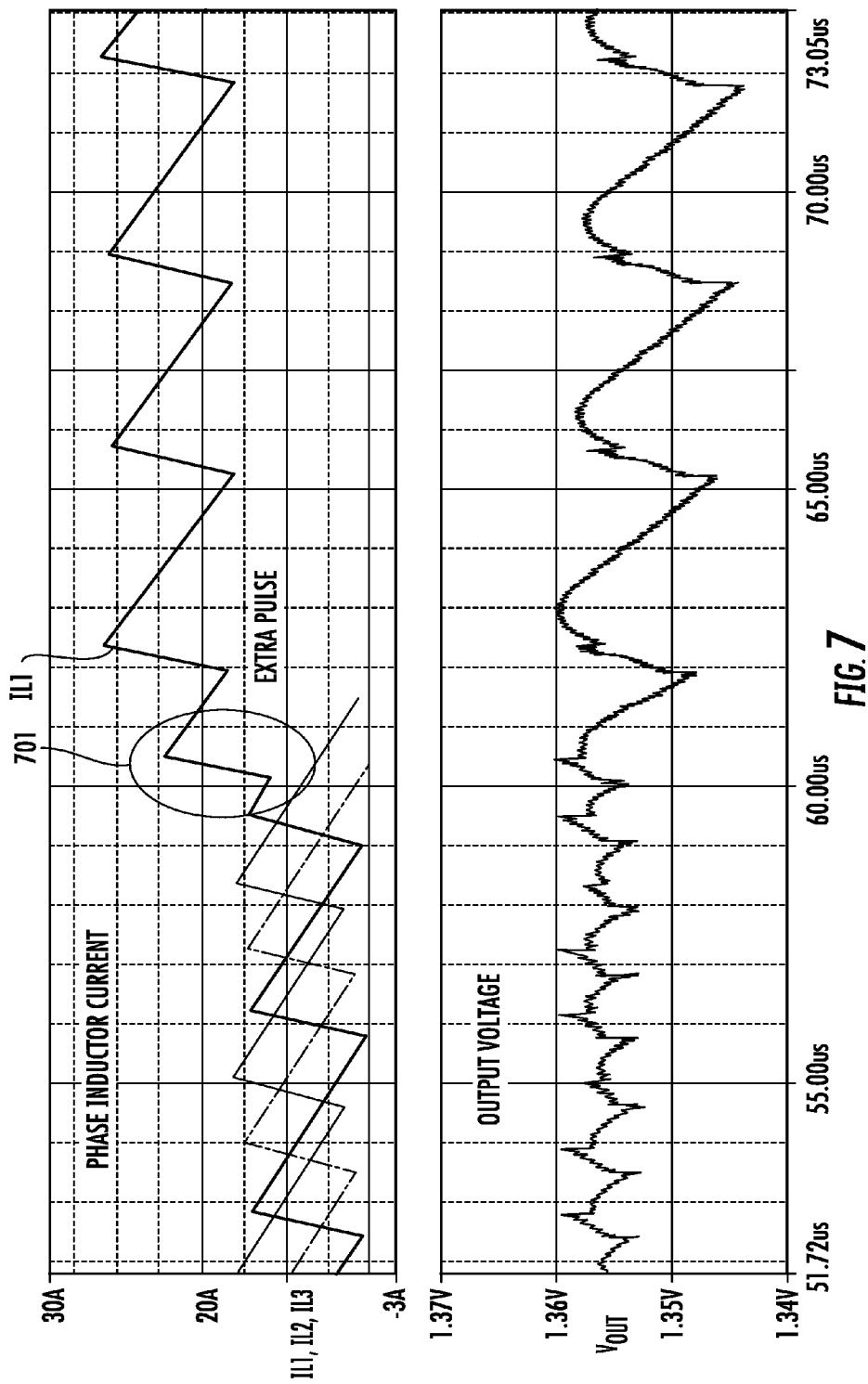

FIGS. 6 and 7 are timing diagrams plotting simulation data for phase-adding and phase-dropping, respectively for a three-phase regulator which drops to single phase operation at low load. In FIG. 6, two phases (phases 2 and 3) are dropped immediately when PSI# is asserted low, while the current in phase 1 increases very fast to take over all load current. When PSI# rises to 1, all phases return to normal operation. The output voltage is maintained with very small deviation between about 1.35 and 1.36 Volts (V). In FIG. 7, an immediate phase dropping procedure is shown in which one extra PWM phase pulse pushes the current of the first phase 1 high as shown at 701, resulting in smooth output voltage transitioning.

A system and method according to the present invention thus improves over known phase dropping regulator schemes by reassigning one or two pulses from the dropped phases to the remaining phases, the remained phase(s) reaching the required load current at a faster rate which allows the dropped phase(s) turn off immediately or with minimum delay without causing significant output voltage deviation. This also significantly improves the overall average efficiency at a high repetitious mode switching rate of the PSI# signal. A system and method according to the present invention can be used with a variety of multiphase voltage regulators, such as, but not limited to DC-DC regulators. A system and method according to the present invention can also be combined with other schemes for improving power efficiency for multiphase voltage regulators.

A multiphase regulator according to one embodiment includes an output node developing an output voltage, a feedback circuit determining error of the output voltage and providing a compensation signal indicative thereof, at least three phase circuits coupled in parallel to the output node, and an adaptive controller. Each phase circuit includes a modulation circuit and a switch circuit. Each modulation circuit receives the compensation signal and generates pulses on a corresponding one of the pulse modulation signals. Each switch circuit is coupled to the output node and is controlled by a corresponding pulse modulation signal. The adaptive controller is responsive to a load indication signal and drops operation of at least one of the phase circuits and adds at least one pulse to a pulse modulation signal of each remaining phase circuit.

The load indication signal may be asserted by a microprocessor to request a low power mode. In one embodiment, the adaptive controller drops operation of all but a selected phase circuit and redirects a pulse from one of the modulation signals corresponding to a dropped phase circuit that is furthest out of phase relative to the selected phase circuit. In another embodiment, the adaptive controller redirects a pulse from the one of the pulse modulation signals corresponding to a dropped phase circuit to a pulse modulation signal of a remaining phase circuit.

In one embodiment, the multiphase regulator includes six phase circuits. The adaptive controller, in response to the load indication signal, drops operation of four phase circuits, redirects a pulse from a pulse modulation signal corresponding to a first dropped phase circuit to a first remaining phase circuit, and redirects a pulse from a pulse modulation signal corresponding to a second dropped phase circuit to a pulse modulation signal of a second remaining phase circuit. In another embodiment, the adaptive controller drops operation of second, third, fifth and sixth phase circuits, redirects a pulse from a pulse modulation signal corresponding to a pulse modulation signal corresponding to the third phase circuit to the first phase circuit, and redirects a pulse from a pulse modulation signal corresponding to the to the sixth phase circuit to a pulse modulation signal corresponding to the fourth phase circuit.

In one embodiment, the modulation circuit includes a leading edge generator which generates leading edge pulses used to initiate pulses on a corresponding pulse modulation signal. In this case, the adaptive controller may be configured to redirect at least one of the leading edge pulses from a dropped phase circuit to a remaining phase circuit to initiate at least one additional pulse on a pulse modulation signal of the remaining phase circuit.

A method of controlling a multiphase regulator according to one embodiment includes controlling at least three phases with corresponding pulse width modulation signals, receiving a mode signal indicating a reduced load condition, dropping at least one phase in response to receiving the mode signal, and adding at least one pulse on a pulse width modulation signal of at least one remaining phase.

The method may include receiving a power state indication signal. The method may include determining load current and providing the mode signal when the load current reaches a predetermined level. The method may include redirecting a pulse from a dropped phase to a remaining phase. The method may include dropping every phase except one selected phase and redirecting at least one pulse from a dropped phase that is furthest out of phase from the one selected phase. The method may include controlling six phases with corresponding pulse width modulation signals, dropping four phases, redirecting a first pulse from a first dropped phase to a first remaining phase, and redirecting a second pulse from a second dropped phase to a second remaining phase.

The method may include controlling first, second, third, fourth, fifth and sixth phases with corresponding pulse width modulation signals, dropping the second, third, fifth and sixth phases, and redirecting a pulse from the third phase to the first phase and redirecting a pulse from the sixth phase to the fourth phase. The method may include controlling first, second, third, fourth, fifth and sixth phases with corresponding pulse width modulation signals, dropping all but the first phase, and redirecting at least one pulse from the fourth phase to the first phase. The method may include generating a leading edge signal for initiating a pulse on the corresponding pulse width modulation signal for each phase, and redirecting at least one leading edge signal from a dropped phase to a remaining phase.

In one embodiment, an adaptive modulator for a multiphase regulator providing a compensation signal indicative of error of an output voltage includes a multiphase leading edge generator, a multiphase pulse modulation generator, and an adaptive controller. The multiphase leading edge generator includes a first set of comparators for comparing corresponding leading edge signals with the compensation signal for generating pulses on a corresponding first set of leading edge signals. The multiphase pulse modulation generator includes a second set of comparators and a corresponding set of set-reset devices. The second set of comparators compare trailing edge pulses with the compensation signal for generating a set of reset signals. Each trailing edge pulse is triggered by a corresponding leading edge signals. Each set-reset device has a set input receiving a corresponding one of the second set of leading edge signals, a reset input receiving a corresponding one of the set of reset signals, and an output for generating a corresponding pulse modulation signal. The adaptive controller has inputs receiving the first set of leading edge signals and outputs providing the second set of leading edge signals. The adaptive controller forwards pulses on the first set of leading edge signals as corresponding pulses on the second set of leading edge signals when a mode select signal is in a first state. The adaptive controller further drops pulses on at least one of the second set of leading edge signals and adds at least one pulse to at least one of the second set of leading edge signals when the mode select signal is in a second state.

The adaptive controller may redirect at least one pulse from at least one of the first set of leading edge signals to at least one of the second set of leading edge signals when the mode select signal is in the second state. The redirected leading edge signal may be that which is furthest out of phase relative to second leading edge signal receiving the pulse. The adaptive controller may redirects at least one pulse from a first of the first set of leading edge signals to a first of the second set of leading edge signals and to redirect at least one pulse from a second of the first set of leading edge signals to a second of the second set of leading edge signals when the mode select signal is in the second state.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A pulse control system for a multiphase regulator, comprising:
   an error amplifier which provides an error signal indicative of output voltage error;
   a multiphase generator which develops modulation pulses for a plurality of phases based on said error signal; and
   an adaptive controller, responsive to a load indication signal indicating a lower load, which drops operation of at least one phase and redirects at least one modulation pulse from a dropped phase to a remaining phase.

2. The pulse control system of claim 1, wherein said load indication signal is received from a microprocessor indicating a low power mode.

3. The pulse control system of claim 1, wherein:
   said multiphase generator comprises a leading edge generator which distributes leading edge pulses among each of said plurality of phases based on said error signal during normal operation;
   wherein said adaptive controller, in response to said load indication signal indicating lower load, redirects at least one leading edge pulse from a dropped phase to a remaining phase; and
   wherein said multiphase generator further comprises a modulation pulse generator which develops a modulation pulse for each leading edge pulse provided by said adaptive controller.

4. The pulse control system of claim 3, wherein said leading edge generator comprises at least one first comparator which compares said error signal with a down ramp signal and wherein said modulation pulse generator comprises at least one second comparator which compares said error signal with an up ramp signal.

5. The pulse control system of claim 1, wherein said adaptive controller drops operation of all but a selected one of said plurality of phases and redirects a modulation pulse from a dropped phase that is furthest out of phase relative to said selected one of said plurality of phases.

6. The pulse control system of claim 1, wherein said plurality of phases comprises six phases, and wherein said adaptive controller, in response to said load indication signal, drops operation of four phases, redirects a modulation pulse from a first dropped phase to a first remaining phase, and redirects a modulation pulse from a second dropped phase to a second remaining phase.

7. The pulse control system of claim 1, wherein:
   said plurality of phases comprises first, second, third, fourth, fifth and sixth phases; and
   wherein said adaptive controller drops operation of said second, third, fifth and sixth phases, redirects a modulation pulse from said third phase to said first phase, and redirects a pulse from said sixth phase to said fourth phase.

8. A method of controlling modulation pulses for a multiphase regulator, comprising:
   providing modulation pulses for a plurality of phases;
   receiving a mode signal indicating a reduced load condition;
   dropping operation of at least one phase in response to receiving the mode signal; and
   redirecting at least one dropped modulation pulse of a dropped phase to a remaining phase.

9. The method of claim 8, wherein said receiving a mode signal comprises receiving a power state indication signal.

10. The method of claim 8, further comprising:
    determining load current; and
    providing the mode signal when the load current reaches a predetermined level.

11. The method of claim 8, wherein said dropping operation of at least one phase comprises dropping operation of every phase except one selected phase, and wherein said redirecting at least one dropped modulation pulse of a dropped phase comprises redirecting at least one modulation pulse from a dropped phase that is furthest out of phase from the one selected phase.

12. The method of claim 8, wherein:
    said providing modulation pulses for a plurality of phases comprises providing modulation pulses for each of six phases;
    wherein said dropping operation of at least one phase comprises dropping operation of four phases; and
    wherein said redirecting at least one dropped modulation pulse of a dropped phase to a remaining phase comprises redirecting a dropped modulation pulse from a first dropped phase to a first remaining phase and redirecting a dropped modulation pulse from a second dropped phase to a second remaining phase.

13. The method of claim 8, wherein:
    said providing modulation pulses for a plurality of phases comprises providing modulation pulses for first, second, third, fourth, fifth and sixth phases;
    wherein said dropping operation of at least one phase comprises dropping operation of the second, third, fifth and sixth phases; and
    wherein said redirecting at least one dropped modulation pulse of a dropped phase to a remaining phase comprises redirecting a dropped modulation pulse from the third phase to the first phase and redirecting a dropped modulation pulse from the sixth phase to the fourth phase.

14. The method of claim 8, wherein:
    said providing modulation pulses for a plurality of phases comprises providing modulation pulses for first, second, third, fourth, fifth and sixth phases;
    wherein said dropping operation of at least one phase comprises dropping operation of all but the first phase; and
    wherein said redirecting at least one dropped modulation pulse of a dropped phase to a remaining phase comprises redirecting at least one dropped modulation pulse from the fourth phase to the first phase.

15. The method of claim 8, wherein:
    said providing modulation pulses for a plurality of phases comprises providing leading edge pulses for each of the plurality of phases;
    wherein said dropping operation of at least one phase comprises dropping leading edge pulses of at least one phase;

wherein said redirecting at least one dropped modulation pulse of a dropped phase to a remaining phase comprises redirecting at least one dropped leading edge pulse to a remaining phase; and wherein said providing modulation pulses for a plurality of phases further comprises terminating remaining and redirected leading edge pulses.

16. A microprocessor system, comprising:
a multiphase regulator, comprising:
   an output node developing an output voltage;
   a feedback circuit determining error of said output voltage and providing a compensation signal indicative thereof;
   a plurality of phase circuits coupled in parallel to said output node, each comprising a modulation circuit receiving said compensation signal and generating pulses on a corresponding one of a plurality of pulse modulation signals, and further comprising a switch circuit coupled to said output node and controlled by said corresponding one of said plurality of pulse modulation signals; and
   an adaptive controller, responsive to a load indication signal, which drops operation of at least one of said phase circuits and which redirects a pulse from said one of said plurality of pulse modulation signals corresponding to a dropped phase circuit to a pulse modulation signal of a remaining phase circuit; and
a microprocessor having a voltage input receiving voltage from said output node and a mode select pin providing said load indication signal.

17. The microprocessor system of claim 16, wherein said microprocessor provides said load indication signal to indicate a low power mode.

18. The microprocessor system of claim 16, wherein said adaptive controller drops operation of all but a selected one of said plurality of phase circuits and redirects a pulse from one of said plurality of pulse modulation signals corresponding to a dropped phase circuit that is furthest out of phase relative to said selected phase circuit.

19. The microprocessor system of claim 16, wherein said plurality of phase circuits comprises six phase circuits, and wherein said adaptive controller, in response to said load indication signal, drops operation of four of said six phase circuits, redirects a pulse from a pulse modulation signal corresponding to a first dropped phase circuit to a first remaining phase circuit, and redirects a pulse from a pulse modulation signal corresponding to a second dropped phase circuit to a pulse modulation signal of a second remaining phase circuit.

20. The microprocessor system of claim 16, wherein:
said plurality of phase circuits comprises first, second, third, fourth, fifth and sixth phase circuits; and
wherein said adaptive controller drops operation of said second, third, fifth and sixth phase circuits, redirects a pulse from a pulse modulation signal corresponding to said third phase circuit to a pulse modulation signal corresponding to said first phase circuit, and redirects a pulse from a pulse modulation signal corresponding to said to said sixth phase circuit to a pulse modulation signal corresponding to said fourth phase circuit.

* * * * *